United States Patent [19]

Neuner

[11] 3,855,536

[45] Dec. 17, 1974

[54] UNIVERSAL PROGRAMMABLE LOGIC FUNCTION

[75] Inventor: James A. Neuner, Pittsburgh, Pa.

[73] Assignee: Westinghouse Electric Corporation, Pittsburgh, Pa.

[22] Filed: Apr. 4, 1972

[21] Appl. No.: 241,038

[52] U.S. Cl. .................... 328/92, 307/207, 307/211, 307/215, 307/289, 328/206, 340/213 R

[51] Int. Cl. . H03k 19/08, H03k 19/36, H03k 19/44

[58] Field of Search ........... 307/204, 207, 211, 214, 307/215, 217, 218, 289; 328/92, 94, 96, 93, 195, 206

[56] References Cited

UNITED STATES PATENTS

| | | | |
|---|---|---|---|
| 3,226,569 | 12/1965 | James | 328/92 X |
| 3,296,424 | 1/1967 | Cohn | 307/211 X |
| 3,428,830 | 2/1969 | McEvoy | 328/206 X |
| 3,441,859 | 4/1969 | Cohn | 328/92 |
| 3,458,240 | 7/1969 | Hanson | 307/215 X |
| 3,510,787 | 5/1970 | Pound et al. | 328/206 |
| 3,524,073 | 8/1970 | Tobin | 307/204 X |
| 3,538,498 | 11/1970 | Games et al. | 307/211 X |
| 3,575,608 | 4/1971 | Barth | 328/206 X |
| 3,579,119 | 5/1971 | Yau et al. | 328/92 |
| 3,588,545 | 6/1971 | Wright | 307/218 X |
| 3,619,583 | 11/1971 | Arnold | 328/92 X |
| 3,634,665 | 1/1972 | Carter | 307/204 X |
| 3,665,173 | 5/1972 | Bouricius et al. | 307/204 X |
| 3,700,868 | 10/1972 | Silvertson | 307/207 X |
| 3,710,318 | 1/1973 | Powell | 328/92 X |

OTHER PUBLICATIONS

Osseck et al., "Performing Logic with Latch Circuit," IBM Tech. Dis. Bull., Vol. 8, No. 6, p. 855, 11/1965.

*Primary Examiner*—Rudolph V. Rolinec
*Assistant Examiner*—L. N. Anagnos
*Attorney, Agent, or Firm*—D. C. Abeles

[57] ABSTRACT

A programmable, universal logic circuit is disclosed which provides with a minimum of back wiring, any of the basic logic functions 1/1, 1/2, 1/3, 1/4, 2/2, 2/3, 2/4, and reset (R-S) flip-flop and can be used as a basic building block in the construction of more complex logic functions than those presently described. The *m/n* notation completely describes most required functions in that n is the total number of inputs and m is the minimum number of those n inputs which must indicate a given logic state in order to cause some predetermined action. In addition, the universal circuit is designed such that unused inputs left floating, will be accepted as assuming an alternate logic state, not requiring some predetermined action. Thus, a *m/n* function can degenerate to a *m*/(*n*-1) or a *m*/(*n*-2) function if one or two inputs, respectively, are not supplied.

31 Claims, 26 Drawing Figures

PATENTED DEC 17 1974 3,855,536

SHEET 4 OF 7

2/2 AND 2/2 =4/4

1/4 OR 1/4=1/8

UNIVERSAL PROGRAMMABLE LOGIC FUNCTION

CROSS REFERENCE TO RELATED APPLICATION

The present application is related to the inventions described in copending applications Ser. No. 240,938 (Westinghouse Case No. 43,135) entitled Communication Between Redundant Protection and SafeGuards Logic Systems with a Nuclear Reactor Power Plant by Means of Light filed Apr. 4, 1972; copending application Ser. No. 240,939 (Westinghouse Case No. 43,136) entitled A Cyclic (OR) Monitoring System for Displaying the Outputs of Two Substantially Similar Trains of Logic filed Apr. 4, 1972, and copending application Ser. No. 241,049 (W.E. Case 43,137) entitled A programmable Tester for Testing Reactor Protection and Safeguards Systems filed Apr. 4, 1973. All the aforementioned applications are invented by the inventor of the subject application and are assigned to the assignee thereof.

BACKGROUND OF THE INVENTION

The present invention pertains in general to a programmable universal logic circuit and more particularly to such a circuit that can perform any one of the plurality of logic functions required in the protection and safeguard systems of a nuclear reactor.

The present day operation of nuclear power plants requires redundant protection and safeguard systems to protect the public and equipment in the unlikely event of an adverse reactor operating condition or nuclear accident. At present, an electromechanical protection and safeguard system is used between the nuclear sensors, which are employed to detect such a condition, and the actuation mechanisms, such as shutdown rods, containment sprays, safety injection systems, emergency diesel start-ups, etc., which are employed to control such a condition. Electromechanical protection and safeguard systems utilize two identical trains of logic, each receiving approximately 200 signals from four bistable channels. Either logic train is capable of initiating the required actuations to protect personnel and equipment. Each logic train and each bistable channel is electrically and physically separated from all others and periodically tested so that no single failure, as defined by Governmental regulations, can prevent a required actuation of the safety control systems when needed.

Each input signal controls at least one BF relay. The logic is performed using various configurations of electromechanical contacts. In order to maintain the required isolation, separate contacts must be used for monitoring purposes (computer, status lights, and/or annunciators) and a separate pair of field wires to each destination for each signal is required. An additional one and sometimes two relays per input signal per train are used to test the system.

Such systems exhibit all the disadvantages associated with electromechanical systems such as large physical size; large overall power requirements; low reliability; susceptibility to seismic vibrations; high maintenance costs; slow responses; and large amounts of expensive field wiring. Furthermore, each reactor system requires a completely new design and testing is time consuming and incomplete.

Thus, a new system is desired which can replace electromechanical elements with integrated circuits, where possible, to achieve high reliability and better performance. The resulting solid state logic circuitry must be simple and direct in order to enhance reliability and minimize cost. Accordingly, the solid state circuitry must aid in the standardization among and between protection and safeguard systems for two-, three-, and four-loop power plants. Additionally, such a solid state logic circuitry system must be capable of being easily changed and expanded upon or deleted to accommodate the special needs of a particular nuclear power plant. Furthermore, the system which results must have the capability of being easily and completely tested.

SUMMARY OF THE INVENTION

This invention obviates the disadvantages of the prior art by providing a universal, programmable, protection and safeguard logic function which employs solid state circuitry. With a minimum of back wiring, this single circuit can perform any of the basic logic functions required (1/1, 1/2, 1/3, 1/4, 2/2, 2/3, 2/4 and an R-S flip-flop) and can be used as a basic building block in the construction of more complex functions than are presently required. The $m/n$ notation completely describes most required functions in that $n$ is the total number of inputs, and $m$ is the minimum number of those $n$ inputs which must indicate a fault condition in order to cause some predetermined action. In addition, the universal circuit is designed such that unused inputs, left floating, will be accepted as non-fault conditions. Thus, a $m/n$ function can degenerate to a $m/(n-1)$ or $m/(n-2)$ function if one or two inputs, respectively, are not supplied. This greatly aids standardization and minimizes back wiring.

A circuit employing positive logic and capable of providing the desired characteristics described, is illustrated in the preferred embodiments set forth hereinafter. The signal conventions assumed are that a 0 (logical zero) at an input indicates a fault condition and a 0 at the output indicates that an actuation is commanded. The necessary connections required to program the universal logic circuit to produce the eight basic functions described are set forth. Output terminals are provided which can be connected to like output terminals on similar circuits to achieve either an AND'ed or OR'ed function of the basic logic function performed by the individual circuits so as to produce more complex functions where needed. Additionally, to increase the versatility of the module, inhibiting inputs, compatible with other outputs, are provided to inhibit an actuation command when desired. Because of the signal conventions assumed and the High Threshold logic used, input error signals are easily imposed to conduct a complete check of the system. High Threshold Logic (HTL) is a new logic family recently assimilated within the state of the art. HTL is similar to transistor-transistor logic and diode-transistor logic but is powered from a higher power supply voltage (i.e., 15v) and has a nominal threshold of approximately 7.5 v. This coupled with its slower speed makes HTL much less sensitive to electro-magnetic interference as well as to voltage gradients on the ground. Furthermore, the signals employed are easily entered into a multiplex system as will be illustrated in the preferred embodiment.

BRIEF DESCRIPTION OF THE DRAWINGS

For a better understanding of the invention, reference may be had to the preferred embodiment, exemplary of the invention, shown in the accompanying drawings, in which.

DESCRIPTION OF THE PREFERRED EMBODIMENT

The invention to be described provides the circuitry required to implement a single, programmable, universal logic function to accomplish all logic functions now required by the protection and safeguard logic systems employed to protect personnel and equipment within a nuclear reactor power plant.

Figure 1:
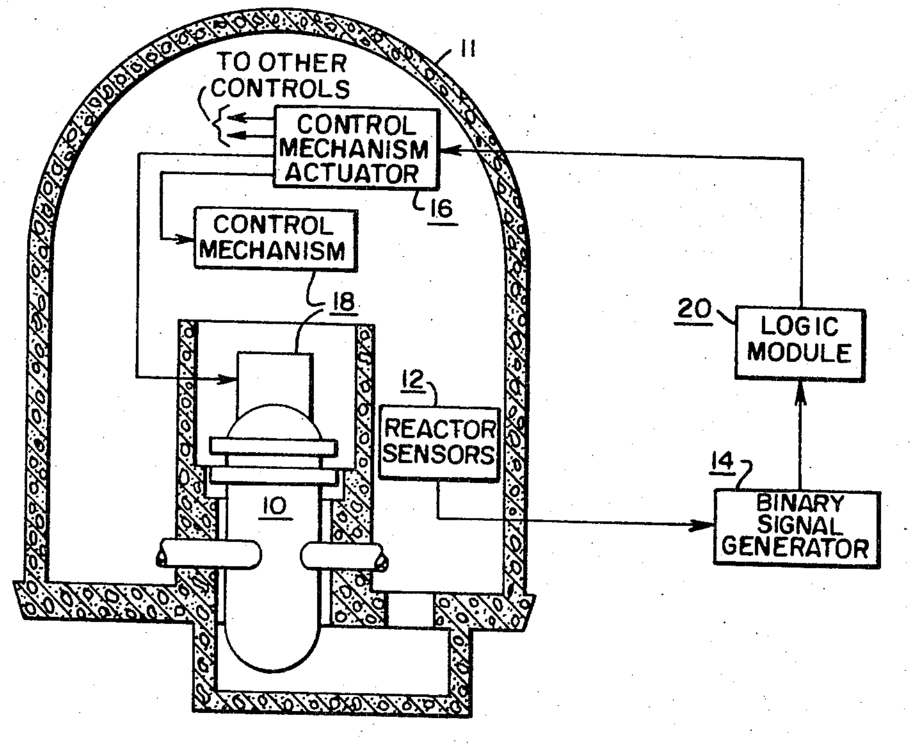
FIG. 1 is a schematic view of a nuclear reactor safeguard and protection system employing this invention.

Electrical power plants, utilizing nuclear reactors, are provided with a plurality of protection systems to protect personnel and equipment from adverse operating conditions and to maintain control of the reactor. Such a protection system is schematically illustrated in FIG. 1 and basically comprises reactor sensors 12 which are positioned within and around the reactor pressure vessel 10 within the reactor containment 11 as well as at other critical points throughout the plant. The reactor sensors 12 include a variety of detectors, such as radiation and temperature detectors, for monitoring adverse operating conditions that normally require actuation of any one of a multiple of emergency and safety control systems 18 to control the reactor 10 in the unlikely event of an accident, such as a rupture of the primary coolant loop piping. The control mechanisms 18 include the reactor shutdown rods; the containment sprays; the reactor safety injection systems; and the emergency diesel start-up. This invention provides the necessary logic communication between the reactor sensors 12 and the control mechanisms 18, illustrated in FIG. 1, to accomplish actuation of those control mechanisms under the proper circumstances. A binary signal generator 14 is included at the output of the reactor sensors 12 to provide the necessary logic input to the logic module 20 of this invention. Binary signal generator 14 may be any one of a plurality of well known devices, such as a threshold logic device, which will provide a binary signal indicating an adverse operating condition. Under the conventions employed in this exemplary embodiment the binary signal generator 14 will provide a binary zero when the corresponding sensors detect an adverse operating condition and a binary one when the reactor is maintained within its normal operating limits. When the required number of sensors indicate that an adverse operating condition exists a logical zero input is provided from the corresponding sensors to the logic module 20 of this invention. The logic module 20 will then provide logical zero output to an actuation mechanism 16 such as an Under-Voltage Coil which will command insertion of the shutdown rods by removing the power supply from the rod control system. With a minimum of back wiring, the single circuit represented by logic module 20 can be programmed to perform any of the basic functions 1/1, 1/2, 1/3, 1/4, 2/2, 2/3, 2/4, and an R-S flip-flop and can be used as a basic building block in the construction of more complex functions than are presently required. The *m/n* notation completely describes most required functions in that *n* is the total number of inputs from the sensors 12 and *m* is the minimum number of *n* inputs which must indicate a fault condition i.e., a logical zero, before some predetermined action, i.e., actuation of the control mechanisms 18, is commanded. In addition, the universal function is designed such that unused inputs, left floating, will be accepted as indicating that a non-fault condition exists. Thus, a *m/n* function can degenerate to a *m*/(*n*–1) or *m*/(*n*–2) function if one or two inputs are not supplied, respectively. This greatly aids standardization of the necessary protection and safeguard systems for two-, three-, and four-loop nuclear power plants and minimizes backwiring.

Figure 2:
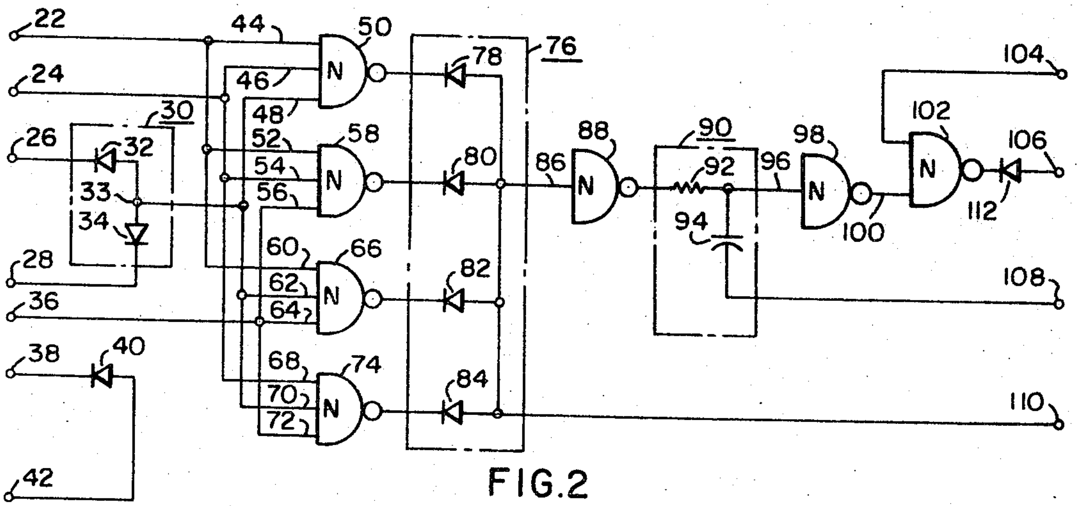
FIG. 2 is a schematic diagram illustrating an exemplary basic circuit which may be employed to practice this invention.

A basic exemplary circuit capable of providing the desired characteristics contemplated by this invention is illustrated in FIG. 2. The signal conventions assumed are that a 0 at an input indicates a fault condition and a 0 at the output indicates that an actuation is commanded. FIGS. 3-25 show the connections required to program the universal logic function to produce the respective eight basic logic functions previously described. In addition, connections are shown for providing the AND and OR capability. By using the programmable, universal logic function as a basic building block and the connections illustrated in FIGS. 17 and 18, as examples, more complex functions can easily be constructed where needed.

Figure 17:
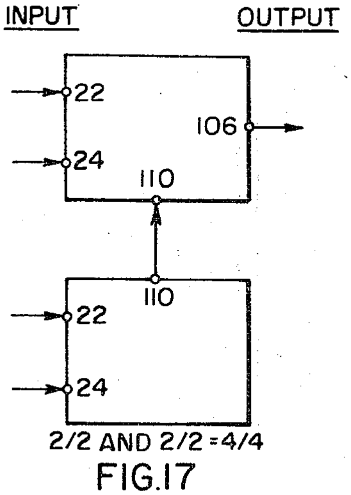
FIG. 17 is a box diagram of the connections required to AND the functions produced by a plurality of circuits similar to the circuit illustrated in FIG. 2.
Figure 18:
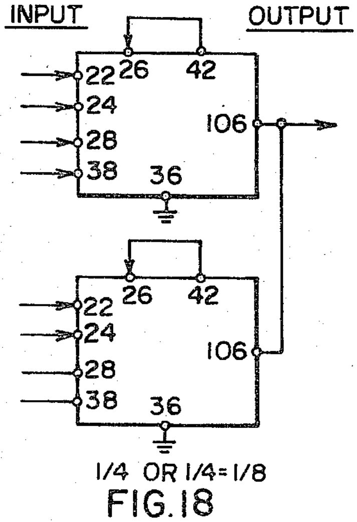
FIG. 18 is a box diagram illustrating the connections required to OR the functions produced by the plurality of circuits illustrated in FIG. 2.

The basic logic, in the circuit of FIG. 2, is performed by NAND gates 50, 58, 66 and 74. The output of gate 102 is the same as the output of 88, except that it can be delayed by approximately 250 microseconds by grounding terminal 108 for increased AC noise immunity when a R-S flip-flop is programmed and it can be inhibited by introducing 0 at terminal 104. Terminal 110 is the AND terminal. As long as a 0 appears at terminal 110, the output will always be a 1 (logical one). Therefore, functions may be AND'ed together by simply connecting their 110 terminals, or they may be OR'ed together by connecting their outputs 106 as shown in FIGS. 17 and 18, respectively.

FIG. 2 shows seven open terminals 22, 24, 26, 28, 36, 38 and 42 on the input side of the logic circuit. Terminals 38 and 42 are electrically connected, with a diode 40 interposed therebetween, positioned in a direction to pass current from terminal 42 to terminal 38. The function of the various terminals will be described hereinafter with reference to programming the logic circuit to perform the plurality of logic functions. Terminals 26 and 28 are electrically connected through diodes 32 and 34, respectively, to a common terminal 33 and the respective diodes 32 and 34 are positioned to pass current from terminal 33 to the corresponding terminals 26 and 28. Diodes 32 and 34 function as an AND gate so as to provide a 0 output at terminal 33 when either terminal 26 or 28 is provided with a 0 input. If both terminals 26 and 28 receive a 1 input, respectively, then the output at terminal 33 will assume a 1 binary state. Terminal 33, is in turn, electrically connected to terminals 48, 62 and 70 of NAND gates 50, 66 and 74, respectively. Terminal 22 is connected to inputs 44, 52 and 60 and NAND gates 50, 58, and 66, respectively. Similarly, terminal 24 is connected to input terminals 46, 54 and 68 of NAND gates 50, 58 and 74, respectively. The respective outputs of NAND gates 50, 58 66 and 74 are joined at common terminal 86 through respective diodes 78, 80, 82 and 84, which are provided in a direction to pass current from terminal 86 to the respective outputs of the aforedescribed NAND gates. Diodes 78, 80, 82 and 84 function jointly as an AND gate 76 to provide a 0 output at terminal 86 when any one of the respective diode inputs to AND gate 76 assumes the 0 state. The output 86 of AND gate 76 will assume the 1 state when and only when all the respective diode inputs assume the 1 state. As previously described, the output 106 of NAND gate 102 will be identical with the output of gate 88. Therefore, where the versatility of the circuit presently being described is not required, circuits of lesser versatility may be employed omitting NAND gates 88 and 98 along with the associated filter 90 positioned therebetween. Gate 88 is illustrated as a NAND gate with one input at terminal 86 and therefore functions as an inverter. Because the versatility of a NAND gate is not required in this embodiment, gate 88 may be replaced with any circuit that performs the inverter function. Thus, a logical zero input at terminal 86 to NAND gate 88 will appear at the output as a 1, while a 1 input at terminal 86 will appear at the output to gate 88 as a 0. The output of gate 88 is identical with the input of gate 98 except that it may be delayed by approximately 250 microseconds by grounding terminal 108 for increased AC noise immunity. Similarly, gate 98 is illustrated as a NAND gate having one input terminal 96 and therefore functions as an inverter to provide an inverted output at terminal 100. NAND gate 102 has two inputs from terminals 100 and 104, respectively. When terminal 104 is normally left floating, NAND gate 102 functions as an inverter and provides an output at terminal 106 which is an inversion of the input provided at terminal 100. Terminal 104 is arranged to inhibit operation of the entire circuit. When a 0 is provided at terminal 104 (i.e., by grounding terminal 104) then the output of the circuit at terminal 106 will remain 1 indicating a non-fault condition exists where no actuation command is required. Thus, terminal 104 can be used during normal operation or during testing to prevent an undesirable actuation command.

Figure 3:
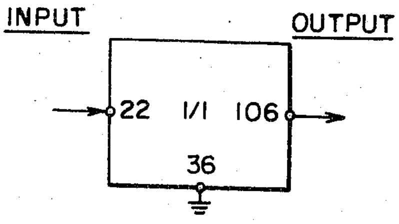
FIG. 3 is a box diagram illustrating the connections required to program the circuit of FIG. 2 to perform the 1/1 logic function.

FIG. 3 is a box diagram illustrating the connections required to program the circuit of FIG. 2 to perform the logic function 1/1. The particular type of logic function required for a particular nuclear application will depend upon the number of sensors that are present to detect a particular nuclear occurrence and the desired number of those sensors present which must indicate such an occurrence before an actuation of the control mechanisms is commanded. The logic function 1/1 indicates that there is an input from one sensor and that that sensor must indicate a fault condition by providing a logical zero to the designated input of the logic circuit 20 before an actuation will be commanded by the appearance of a logical zero at terminal 106 of the logic module.

Figure 4:
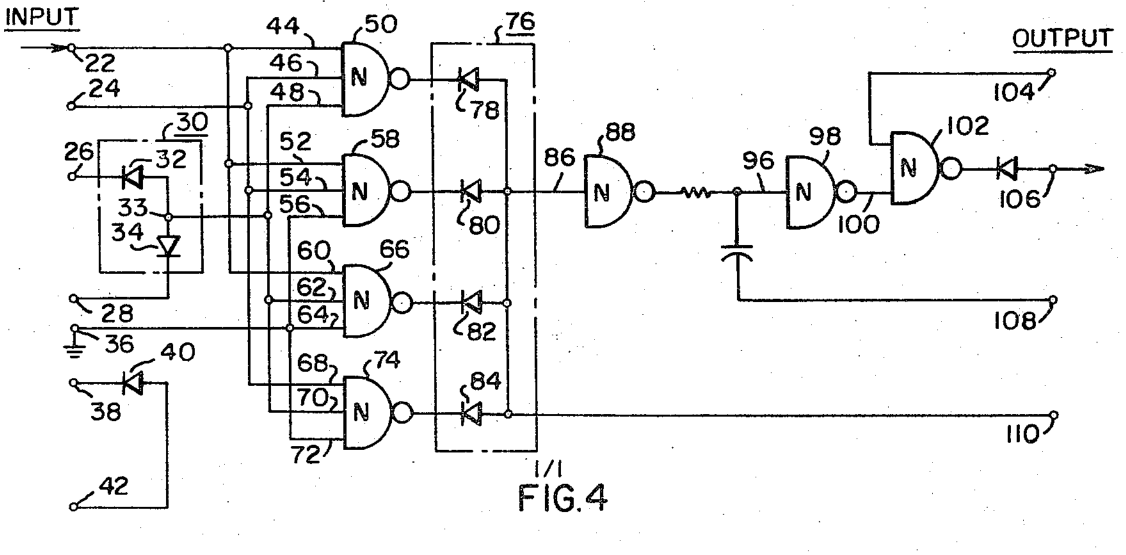
FIG. 4 is a schematic diagram of the circuit of FIG. 2, programmed as illustrated in FIG. 3, to perform the logic function 1/1.

FIG. 4 is a schematic circuitry diagram of the circuit illustrated in FIG. 2 programmed as designated in FIG.

3, to perform the 1/1 logic function. A single input is provided at terminal 22 and terminal 36 is grounded so as to enable the desired output function to appear at terminal 106. It should be noted that corresponding reference characters refer to corresponding elements on the various figures. The ground at terminal 36 in FIG. 4 provides a 0 input to NAND gates 58, 66 and 74, resulting in a 1 output at the respective NAND output terminals, irregardless of the other inputs provided to those gates. Gate 50 has inputs, respectively, from terminals 22, 24, 26 and 28; terminals 24, 26 and 28 being left floating and accepted at the input to gate 50 as a 1 indicating a nonfault condition. Terminal 22 controls the output of gate 50 so that when a 1 appears across terminal 22 the output of gate 50 will assume a 0, causing a 0 input to one diode of AND gate 76. Terminal 86 will in turn assume the logical zero state enabling a 1 output at terminal 106 indicating a non-fault condition not requiring actuation of the control mechanisms. When a logical zero appears across terminal 22, indicating a fault condition, a logical one will appear at the output of gate 50 and AND gate 76 will provide a logical one at terminal 86 which will be communicated to terminal 106 as a logical zero requiring actuation. Thus, whenever a logical zero, indicating a fault condition from the individual sensor, appears at input 22, a logical zero will appear at output terminal 106 indicating an actuation command and thus fulfilling the 1/1 logic function.

Figure 5:
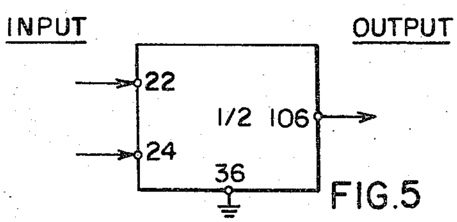
FIG. 5 is a box diagram illustrating the connections required to program the circuit of FIG. 2 to perform the logic function 1/2.

FIG. 5 is a box diagram indicating the connections required to program the circuit of FIG. 2 to perform the 1/2 logic function. That is to say that two sensor inputs are provided for monitoring a particular reactor condition and at least one of those sensors must indicate an adverse condition before an actuation command is given at the output terminal 106.

Figure 6:
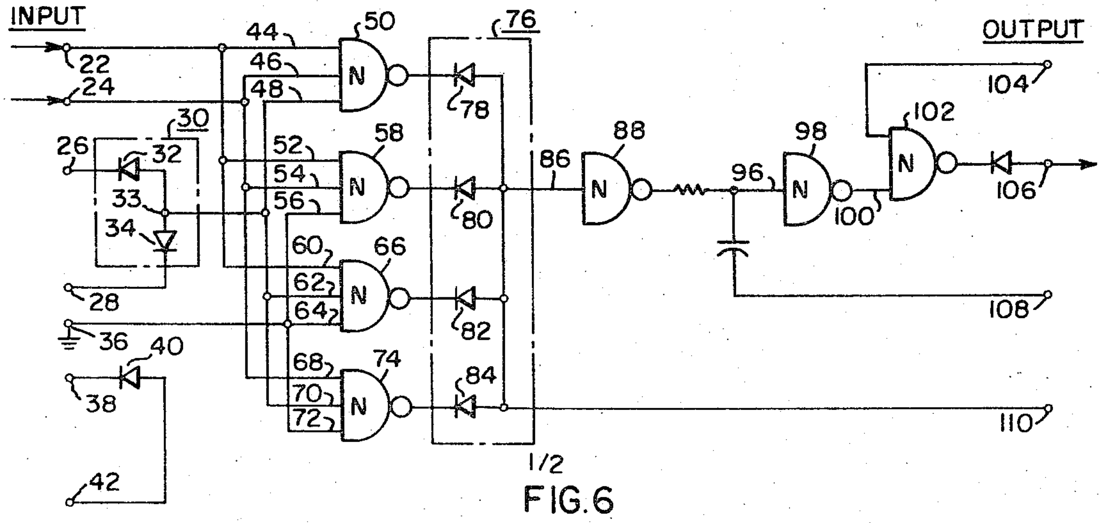
FIG. 6 is a schematic diagram of the circuit of FIG. 2, programmed as illustrated in FIG. 5, to perform the logic function 1/2.

FIG. 6 is a schematic circuitry diagram showing the circuit illustrated in FIG. 2, programmed as designated in FIG. 5, to produce the 1/2 logic function. The circuit thus illustrated is identical with the circuit illustrated in FIG. 4 with the addition of a second sensor input supplied to terminal 24. As described with reference to FIG. 4, gates 58, 66 and 74 have at least one input tied to ground producing a logical zero input signal to the respective NAND gates, resulting in a logical one output from each of the corresponding gate output terminals. Gate 50 has one input 48 left floating which is accepted as a logical one, while inputs 46 and 44 from terminals 24 and 22, respectively, control the output of the circuit. Thus, when a logical zero input appears across either terminal 22 or 24, the output of gate 50 will produce a logical one, coinciding with the logical one inputs to AND gate 76 supplied by NAND gates 58, 66 and 74. The logical one will be communicated to terminal 86 and appear as a logical zero output at terminal 106, requiring an actuation. Thus, when either sensor being inputted to terminals 22 and 24, respectively, provides a logical zero signal indicating a fault condition, a logical zero signal will appear across the output terminal 106 requiring actuation; thereby fulfilling the 1/2 logic fucntion.

Figure 7:
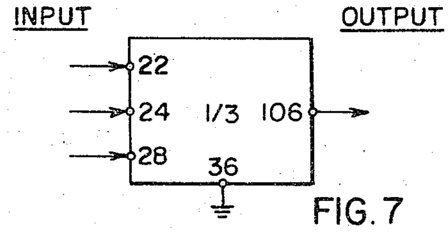
FIG. 7 is a box diagram illustrating the connections required to program the circuit in FIG. 2 to perform the logic function 1/3.

FIG. 7 is a box diagram illustrating the connections required to program the circuit of FIG. 2 to perform the 1/3 logic function. That is to say that in a protection system having three sensors monitoring a particular reactor condition, at least one of those sensors will have to indicate a fault condition before actuation of the respective control mechanisms is commanded.

Figure 8:
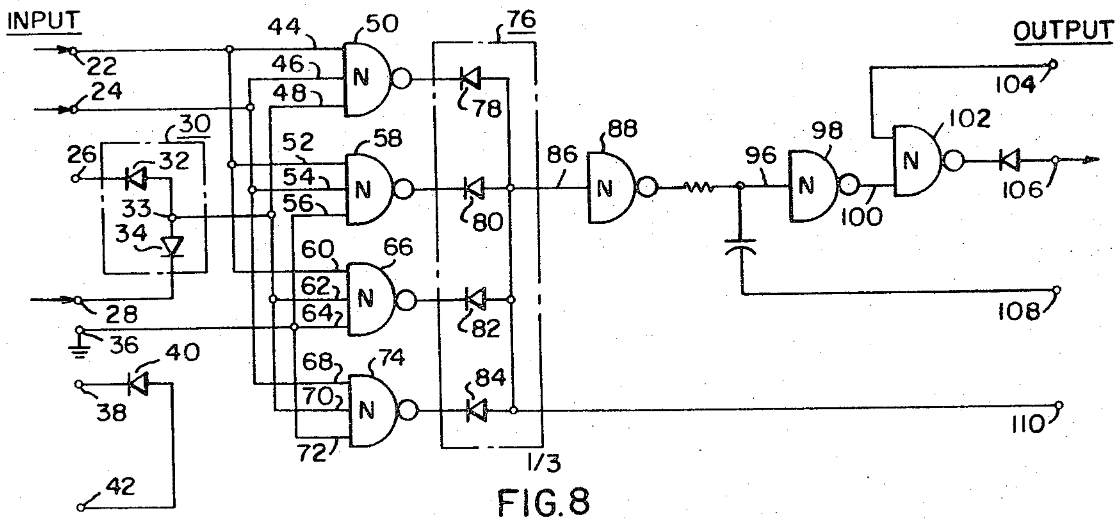
FIG. 8 is a schematic circuitry diagram of the circuit of FIG. 2, programmed as illustrated in FIG. 7, to perform the logic function 1/3.

FIG. 8 is a schematic diagram showing the circuit of FIG. 2 programmed as designated in FIG. 7. The circuit arrangement is identical to the circuit arrangement illustrated in FIG. 6 with the addition of a third sensor input supplied to terminal 28. Since terminal 26 is left floating and accepted as assuming a logical one state diode AND gate 30 will function to pass a logical one if and only if a logical one signal input appears across terminal 28. Conversely diode AND gate 30 will function to pass a logical zero if and only if a logical zero input appears across terminal 28. As previously described with reference to FIGS. 4 and 6, one input terminal of gates 58, 66 and 74, respectively, is connected to ground, maintaining a logical one output at each of those respective gates. The three inputs to gate 50 are respectively supplied by the three sensors having corresponding inputs at terminals 22, 24 and 28. When any one of the inputs to gate 50 from terminals 22, 24 and 26 assume the logical zero state the output of gate 50 will assume the logical one state providing a logical one at terminal 86 which will appear as a logical zero at terminal 106 requiring actuation of the control mechanisms. Only when all of the inputs 20, 24 and 28 assume a logical one state, indicating a non-fault condition, will the output of state 50 assume a logical zero providing a logical zero at terminal 86 and a logical one at terminal 106, indicating a nonfault condition which does not require actuation of the control mechanisms.

Figure 9:
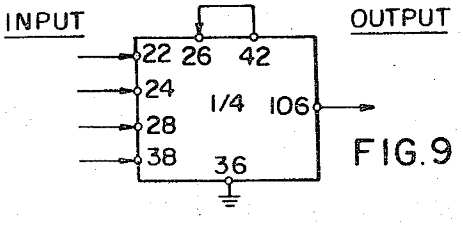
FIG. 9 is a box diagram illustrating the connections required to program the circuit of FIG. 2 to perform the logic function 1/4.

FIG. 9 is a block diagram indicating the connections required to program the circuit of FIG. 2 to perform the logic function 1/4. Such a function is desired where there are four sensors monitoring the reactor for a particular condition and an actuation of the control mechanisms is required when any one of the four sensors indicates a fault condition.

Figure 10:
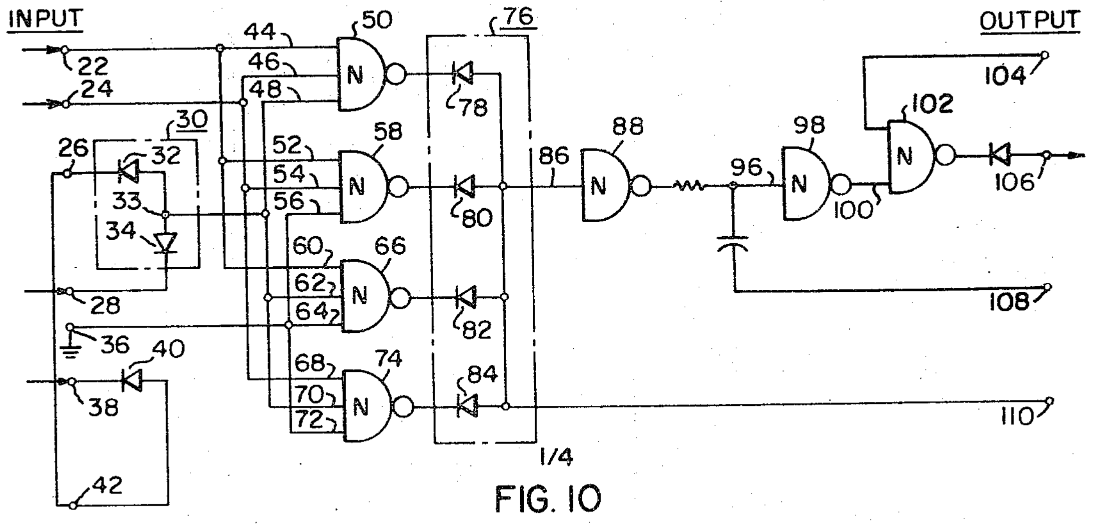
FIG. 10 is a schematic circuitry diagram of the circuit illustrated in FIG. 2, programmed as illustrated in FIG. 9, to perform the logic functions 1/4.

FIG. 10 is a schematic circuitry diagram illustrating the circuit of FIG. 2 programmed as designated in FIG. 9. The circuit arrangement provided in FIG. 10 is identical to the circuit arrangement provided in FIG. 8 with an additional programmed connection coupling terminal 26 to terminal 42 and an additional input from a fourth sensor supplied to terminal 38 yielding a total of four such inputs. The introduction of diode 40 into the circuit does not affect the operation of AND gate 30 and merely operates as a blocking diode. The operation of AND gate 30 is identical to that previously described and effectively provides an additional input to gate 50. As indicated with reference to FIG. 8 gates 58, 66 and 74 have one input terminal, respectively, connected to ground providing a logical zero input to each of the respective NAND gates resulting in a logical one output at each of the corresponding gate output terminals. Therefore, as described with reference to FIG. 8, gate 50 will be controlling. When either of the inputs to gate 50 assume the logical zero state, a logical one state output will appear at gate 50 which will be communicated as a logical one to terminal 86 and appear as a logical zero at terminal 106, requiring actuation of the safety mechanisms. Only under circumstances where the corresponding monitors provide appropriate signals to the respective inputs 22, 24, 28 and 38, indicating a nonfault condition, will the output of gate 50 assume a logical zero, enabling a logical zero at terminal 86 and a logical one state at terminal 106. Thus, the 1/4 logic function is accomplished where any one monitor indicating a fault condition will provide actuation of the control mechanisms.

Figure 11:
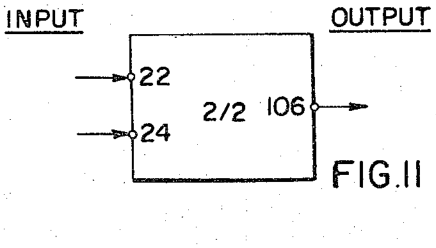
FIG. 11 is a box diagram illustrating the connections required to program the circuit of FIG. 2 to perform a logic function 2/2.

FIG. 11 is a box diagram indicating the connections required to program the circuit of FIG. 2 to perform the 2/2 logic function. The 2/2 logic function indicates that there are two sensors monitoring the reactor for a particular condition which if determined to be adverse would require actuation of the control mechanisms; an adverse condition being required to be detected by both sensors before such an actuation is commanded.

Figure 12:
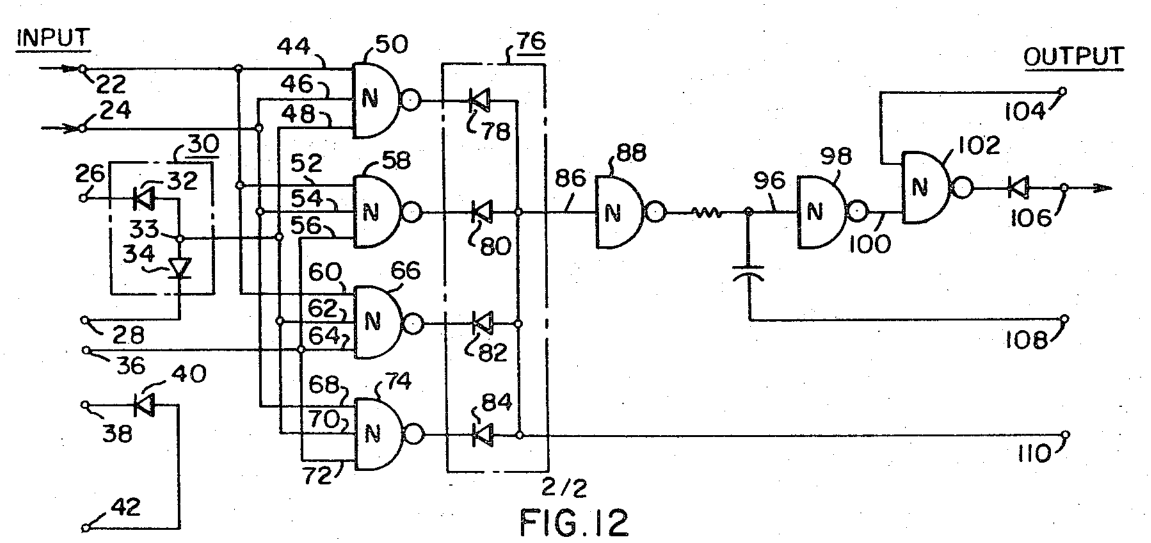
FIG. 12 is a schematic circuitry diagram of the circuit illustrated in FIG. 2, programmed as illustrated in FIG. 11.

FIG. 12 is a schematic diagram of the circuit of FIG. 2, programmed as designated in FIG. 11, to provide the 2/2 logic function. As will be observed by reference to FIG. 12, input signals from two monitors are supplied, respectively, to terminals 22 and 24. All of the remaining open terminals provided in the circuit of FIG. 2 are left floating and will be accepted at their connections to the inputs of the respective NAND gates as assuming a logical one state. In order for a fault condition requiring command actuation to be indicated at terminal 106 a logical one state will have to appear at terminal 86 requiring that a logical one state appear at the output of each of the NAND gates 50, 58, 66 and 74. The foregoing is due to the basic operational characteristics of AND gate 76 which requires a logical one at each input terminal before the output terminal assumes the logical one state. In order for each of the NAND gates 50, 58, 66 and 74 to assume a logical one output, at least one of the three inputs of the respective gates 50, 58, 66, and 74 must assume the logical zero state. Terminals 22 and 24 provide two respective inputs to corresponding gates 50 and 58; terminal 22 provides one input to gate 66; and terminal 24 provides one input to gate 74. Thus, in order for each of the aforementioned gates to have at least one "logical zero input," each of the terminals 22 and 24 will have to assume the logical zero state indicating that the respective sensors, which feed terminals 22 and 24, detect that an adverse condition exists. If terminal 22 assumes the logical zero state and terminal 24 assumes the logical one state then the outputs of gates 50, 58 and 66 will assume the logical one state, while the output of gate 74 will assume the logical zero state providing a logical zero at terminal 86 and a logical one at terminal 106. Conversely, if terminal 24 assumes the logical zero state and terminal 22 assumes the logical one state, then the respective outputs of gates 50, 58 and 74 will assume the logical one state and the output of gate 66 will assume a logical zero state, enabling a logical zero at terminal 86 and a logical one at output terminal 106. Thus, the 2/2 logic function is accomplished wherein a fault condition must be indicated by both of the sensors feeding their respective terminals 22 and 24 before a logical zero output appears at terminal 106 indicating that an actuation is commanded.

Figure 13:
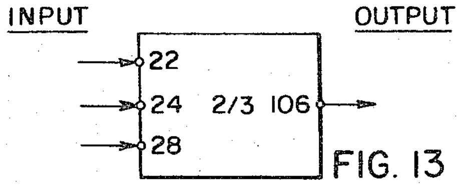
FIG. 13 is a box diagram illustrating the connections required to program the circuit of FIG. 2 to perform the logic function 2/3.

FIG. 13 shows a box diagram indicating the connections required to program the circuit of FIG. 2 to perform the logic function 2/3. Such a function is required in a reactor protection system having three sensors monitoring for a particular adverse condition and two of the three monitors are required to indicate such a condition before actuation of the control mechanisms is required.

Figure 14:
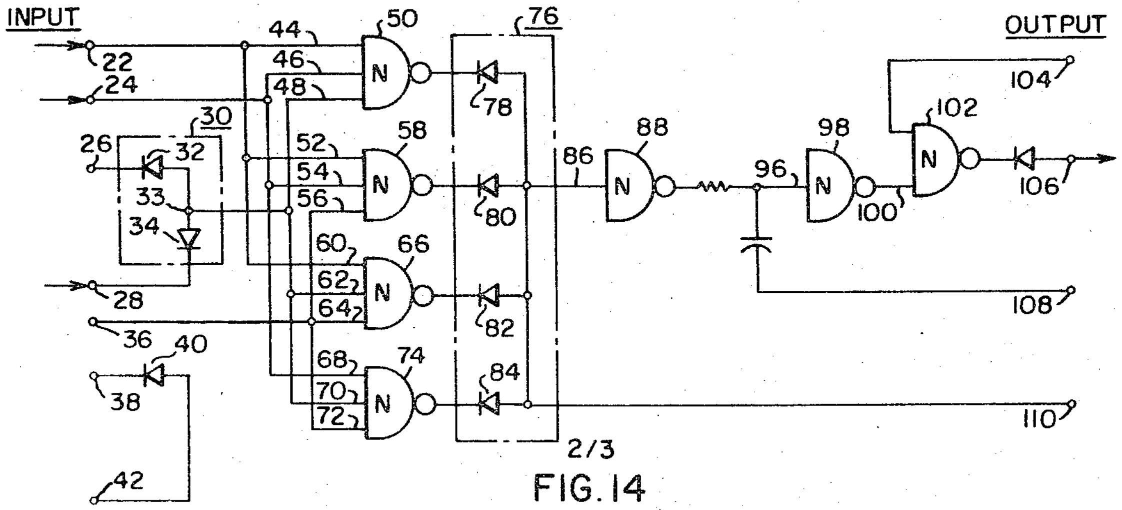
FIG. 14 is a schematic circuitry diagram of the circuit illustrated in FIG. 13, to perform the logic function 2/3.

FIG. 14 is a schematic diagram of the circuit illustrated in FIG. 2, programmed as indicated in FIG. 13, to provide the 2/3 logic function. As will be appreciated by reference to FIG. 12 the circuit provided in FIG. 14 is identical to the circuit shown for providing the 2/2 logic function with an additional input supplied at terminal 28 to accommodate a third sensor monitoring the reactor. Accordingly, in order for a logical zero to appear at terminal 106 indicating an actuation command, a logical one will have to appear at terminal 86, requiring each of the inputs to AND gate 76 to assume the logical one state and gates 50, 58, 66 and 74 to assume the logical one state. This will only occur if a logical zero is provided at at least one input to each of the respective gates 50, 58, 66 and 74. In order for such a condition to exist, two out of the three input terminals 22, 24 and 28 will have to assume the logical zero state. If any two of those three inputs assumes a logical zero state, at least one input to each of the NAND gates 50, 58, 66 and 74 will assume the logical zero state, thus providing the desired actuation signal at the output 106 and accomplishing the 2/3 logic function.

Figure 15:
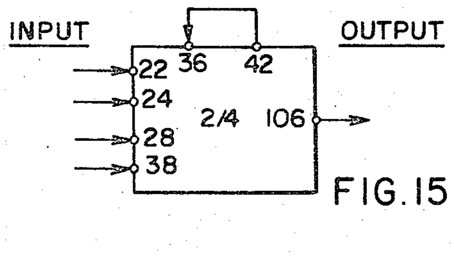
FIG. 15 is a box diagram illustrating the connections required to program the circuit of FIG. 2 to perform the logic function 2/4.

FIG. 15 is a box diagram illustrating the connections required to program the circuit of FIG. 2 to perform the 2/4 logic fucntion. Such a function is useful in a reactor protection system having four sensors monitoring the reactor for a particular condition and an adverse condition is required to be indicated by at least two of the four sensors before an actuation command is initiated. Such a function is particularly desirable under conditions where it is necessary to protect against an erroneous input signal being sent by a defective sensor which might otherwise cause a false actuation of the control mechanisms.

Figure 16:
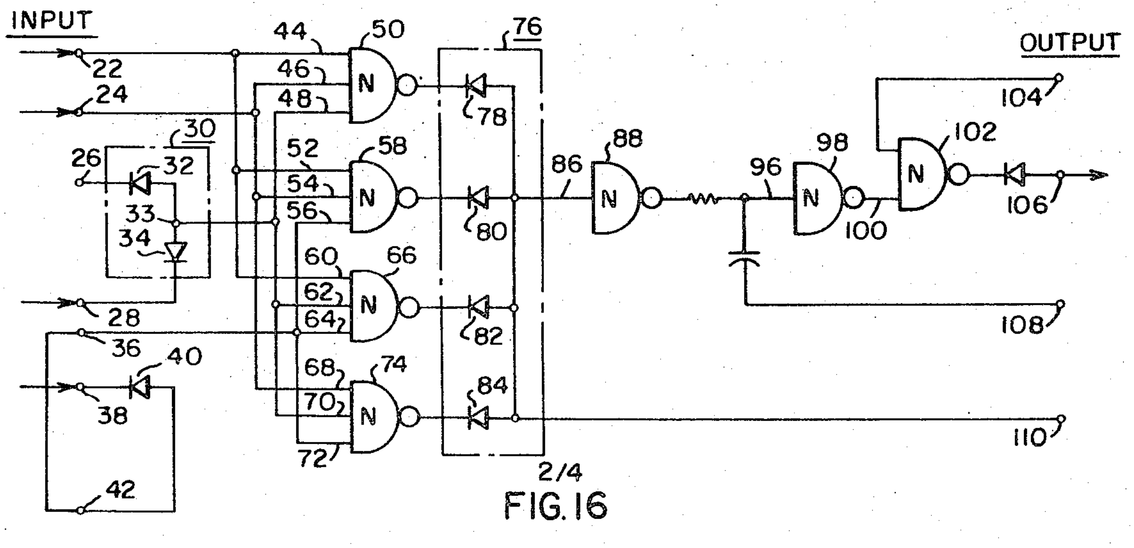
FIG. 16 is a schematic circuitry diagram of the circuit of FIG. 2, programmed as illustrated in FIG. 15, to perform the logic function 2/4.

FIG. 16 is a schematic circuitry diagram of the circuit of FIG. 2 programmed as designated in FIG. 15. The circuit of FIG. 16 is identical to the circuit of FIG. 14 with an additional connection provided between terminals 42 and 36 and an additional input from a fourth sensor supplied to terminal 38. The operation of the circuit is identical to that described with reference to FIG. 14 inasmuch as a logical zero must appear at at least one input terminal to each of the respective NAND gates 50, 58, 66 and 74 before a logical zero will appear at terminal 106 requiring actuation. The input terminals 22, 24, 28 and 38 are designed such that if any two of the four inputs assume the logical zero state, a logical zero will appear at at least one input to each of the four gates 50, 58, 66 and 74, thus accomplishing the 2/4 logic function.

As previously mentioned the universal, programmable logic function of this invention can be used as a basic building block in the construction of more complex functions. The additional logic functions can be achieved by AND'ing several circuits together by the interconnection of their respective 110 terminals. As long as terminal 110 assumes a 0, the output at terminal 106 will always be a 1. Therefore, functions may be AND'ed together by the simple connection of their 110 terminals, as illustrated by the block diagram shown in FIG. 17. That FIG. shows two 2/2 logic functions which are AND'ed together, as described, to provide a 4/4 logic function. Similarly, two circuits performing two logic functions may be OR'ed together by interconnecting their respective outputs provided at terminal 106, as shown by the block diagram illustrated in FIG. 18. FIG. 18 illustrates two 1/4 functions which are OR'ed together to produce a 1/8 function. When two circuits are OR'ed together, in such a fashion, the diodes 112, provided at terminal 106, function jointly as an AND gate in a similar manner to the diodes associated with AND gate 76 illustrated in FIG. 2. Furthermore, it should be understood that two unlike logic functions may be AND'ed or OR'ed together in a similar manner to that illustrated in FIGS. 17 and 18, respectively.

Figure 19:
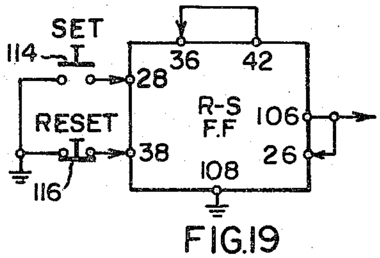
FIG. 19 is a box diagram illustrating the connections required to program the circuit of FIG. 2 to perform the function of an R-S flip-flop.

FIG. 19 is a box diagram illustrating the connections required to program the circuit of FIG. 2 to provide an R-S flip-flop. The R-S flip-flop, thus provided, is a bistable multivibrator circuit in which the simultaneous application of the set and reset inputs provides a 1 output state; the single depression of the reset switch provides a 1 output state; and the single depression of the set switch provides a 0 output state.

Figure 20:
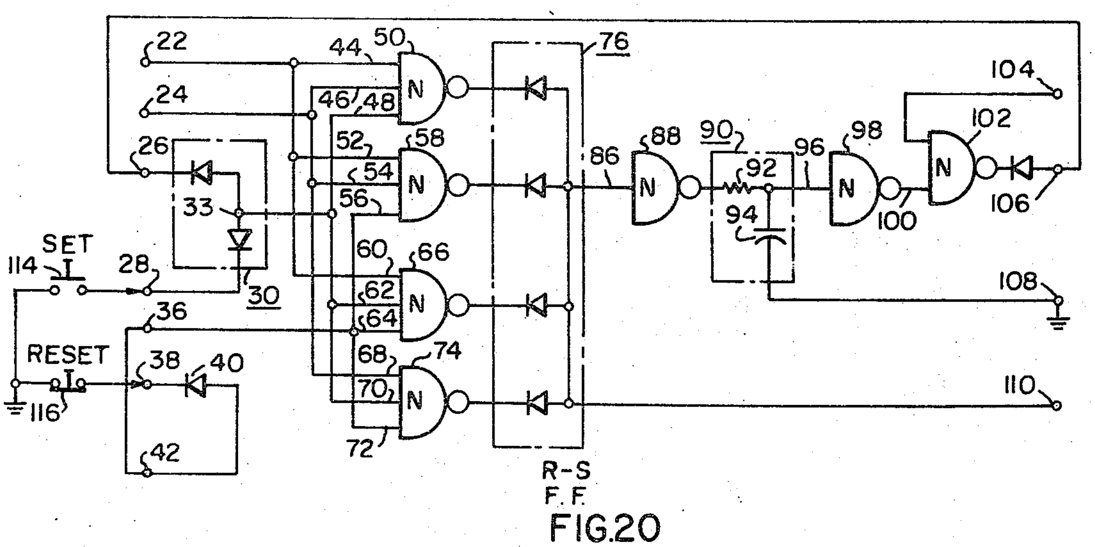
FIG. 20 is a schematic circuitry diagram illustrating the circuit of FIG. 2, programmed as illustrated in FIG. 19.

FIG. 20 is a schematic circuitry diagram of the circuit illustrated in FIG. 2, programmed as designated in FIG. 19, to provide the R-S flip-flop. The circuit of FIG. 20 is identical to the circuit of FIG. 2 with the programmed connections providing electrical communication between terminals 106 and terminal 26. Terminals 36, 42 and 38 are interconnected to ground through a normally closed reset switch 116 and terminal 28 is connected to ground through a normally open set switch 114. All the remaining terminals originally illustrated in FIG. 2 are left floating with the exception of terminal 108 which is grounded. With the set and reset switches 114 and 116 in their normally open and closed position, respectively, the two stable states of the flip-flop can be described. Gates 58, 66 and 74 have at least one of their respective inputs connected to ground through reset switch 116. Accordingly, the outputs of the three respective gates 58, 66 and 74 will be maintained at the one logical state. Consistent with the characteristics of AND circuit 76, the input provided from gate 50 will be controlling. If the output of gate 50 assumes the logical one state then a logical one will appear across terminal 86 providing a logical zero at terminal 106. Conversely, if a logical zero output is provided at the output of gate 50 then a logical zero will appear across terminal 86 causing output terminal 106 to assume the logical 1 state. Thus, if the output at terminal 106 initially assumes the logical one state then terminal 26 will assume the logical one state through their common connection, providing a logical one input to gate 50 at input terminal 48 resulting in a logical zero output at gate 50 and a logical zero at terminal 86, which will maintain the output 106 at the logical one stable state. Thus, if terminal 106 assumes the logical one state initially, without the set or reset switches 114 and 116 depressed, the output at terminal 106 will remain in the 1 stable state. Similarly, if the output at terminal 106 initially assumes the zero logical state, terminal 26 will assume the zero logical state, and input 48 to gate 50 will assume the zero logical state, providing a logical one at the output of gate 50, which will be transmitted to terminal 86 and appear as a logical zero at terminal 106. Thus, if terminal 106 initially assumes a zero logical state and neither the set or reset switches 114 and 116 are depressed, terminal 106 will remain at that logical zero stable state.

To reset the flip-flop reset switch 116 is depressed, disconnecting terminal 36 from ground and leaving each of the inputs to gate 58 floating, producing a logical zero output at gate 58, hich appears as a logical zero at terminal 86, and a logical one at output terminal 106. The logical one at terminal 106 will remain stable until the reset switch is returned to its normally closed position and the set switch is depressed coupling terminal 28 to ground. The ground connection provides a logical zero input to gates 50, 66 and 74, providing a logical one output at those respective gates. Gate 58 receives a logical zero input through input terminal 56, which is coupled to ground through the normally closed reset switch. Thus, each of the respective gates 50, 58, 66 and 74 provides a logical one input to the respective diode terminals of AND gate 76, providing a logical one output at terminal 86 and a logical zero output at terminal 106. The logical zero output will remain stable at terminal 106 until the reset switch is depressed. It should be noted that if the set and reset switches are depressed simultaneously, gate 58 will be left floating producing a logical one output at terminal 106. As previously described, the operation of the flip-flop circuit illustrated in FIG. 20 can be inhibited by providing a logical zero input signal at terminal 104. Additionally, increased AC noise immunity can be provided by coupling terminal 108 to ground. The aforementioned programmed connection at terminal 108 interposes filter 90, comprising resistor 92 and capacitor 94 into the circuit to filter high frequency pulses associated with AC noise and proivde a delay of approximately 215 microseconds between gates 88 and 102. Thus, by programming the circuit of FIG. 2 as designated in FIG. 19 an R-S flip-flop is effectively produced.

The aforementioned operational description of an exemplary programmable, universal, protection and safeguard logic system contemplated by this invention has demonstrated that this invention teaches a single circuit that will perform any one of the plurality of basic functions required in the protection and safeguard systems of a nuclear reactor. Among the functions which can be performed by the circuitry of this invention are the basic logic functions 1/1, 1/2, 1/3, 1/4, 2/2, 2/3, 2/4, and an R-S flip-flop. Furthermore, the circuit described can be used as a basic building block in the construction of many more complex functions than are presently required by AND'ing or OR'ing two or more such circuits together at the designated programmed terminals. It should be further recognized, that alternate circuit arrangements may be constructed to provide the multiple logic functions contemplated by this invention. One such circuit is illustrated in FIG. 21.

Figure 21:
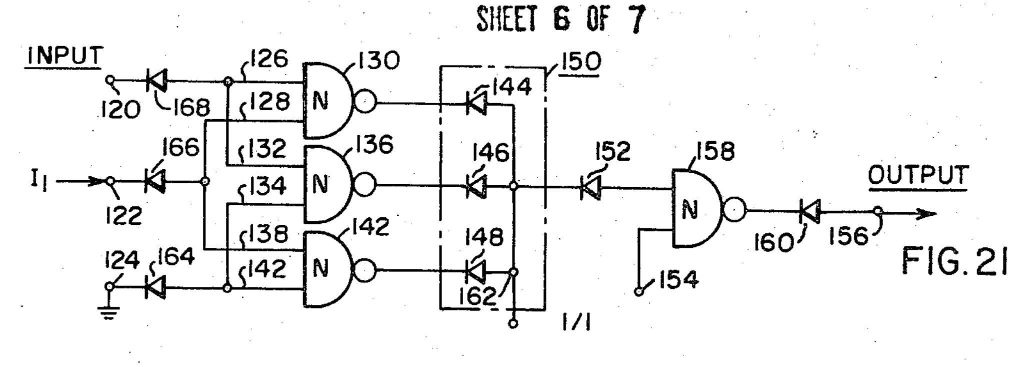
FIG. 21 is a schematic circuitry diagram, exemplary of a second embodiment of this invention, programmed to perform the logic function 1/1.

FIG. 21 shows a schematic diagram of a circuit capable of performing a plurality of the aforedescribed logic functions. The circuit of FIG. 21 is less versatile than the circuit previously described with reference to FIG. 2 and is capable of performing the functions 1/1, 1/2, 2/2, 2/3 and an R-S flip-flop. The functions not provided include 1/3, 1/4 and 2/4. However, it should be noted that these functions can be achieved by AND'ing or OR'ing a plurality of such circuits together in a manner similar to that previously described with reference to FIGS. 17 and 18. The basic circuit of FIG. 21 includes three inputs which are maintained at terminals 120, 122 and 124, respectively. Three NAND gates 130, 136 and 142 are arranged to perform the basic logic function of the circuit and may be analogized to the function performed by gates 50, 58, 66 and 74, illustrated in the circuit of FIG. 2. Input 120 is connected to the corresponding inputs 126 and 132 of gates 130 and 136, respectively. Input 122 is connected to the corresponding inputs 128 and 138 of gates 130 and 142, respectively. Input 124 is connected to the corresponding inputs 134 and 140 of gates 136 and 142, respectively. The outputs of gates 130, 136 and 142, respectively, are fed into diodes 144, 146, and 148 which are arranged to function as AND gate 150. AND gate 150 may be analogized to AND gate 76 illustrated in FIG. 2. The output of AND gate 150 is fed through a blocking diode 152 to NAND gate 158, which supplies the logic function output at terminal 156 through blocking diode 160. Terminal 154 is arranged as an inhibit input to NAND gate 158 and will function in a manner similar to that described for terminal 104, illustrated in the circuit of FIG. 2. The signal conventions assumed are the same as previously described with reference to FIG. 2 in that a logical zero will be accepted at the input to the circuit as indicating a fault condition requiring actuation at the output and a logical one will be accepted as indicating a non-fault condition at the input not requiring actuation of the control mechanisms. Diodes 168, 166 and 164 at the respective inputs 120, 122, and 124 and diodes 152 and 160 function as blocking diodes in conformance with the signal conventions assumed. Furthermore, diode 160 acts in conjunction with corresponding diodes on like outputs of similar circuits to provide the OR'ed terminal connection in a manner similar to that described with reference to the circuit of FIG. 2. Similarly, terminal 162 provides the AND connection in an operating mode where several such circuits are desired to be AND'ed together.

The programmed connections illustrated in FIG. 21 at terminals 122, and 124 are provided to produce the 1/1 logic function. That is to say with one monitoring input imposed at terminal 122 and terminal 124 grounded, a fault condition indicated by a logical zero at terminal 122 will provide a logical zero at output terminal 156 commanding actuation of the control mechanisms.

An analytical operational description of the 1/1 logic function follows. The ground connection at terminal 124 provides a logical zero input to gates 142 and 136 requiring a respective logical one output. Therefore, the input to gate 130 from terminal 122 controls. Terminal 120 is left floating and will be accepted as assuming the logical one state providing a logical one input to terminal 126 of gate 130. If terminal 122 receives a logical one input from the sensor then gate 130 will provide a logical zero output to diode 144 which will appear at the input to gate 158 as a logical zero enabling a 1 output at terminal 156 not requiring actuation. Conversely, if a logical zero input is received from the sensor at gate 122, indicating a fault condition, a logical zero input will appear at terminal 128 of gate 130, enabling a 1 output. The output of AND gate 150 will then assume the logical one state and a logical zero output will appear at terminal 156 requiring actuation. Therefore, a logical one input signal from the single sensor will provide a logical one output at terminal 156 not requiring actuation, while a logical zero input at terminal 122 from the single sensor will provide a logical zero output at terminal 156 requiring actuation; thus, producing the 1/1 logic function.

Figure 22:
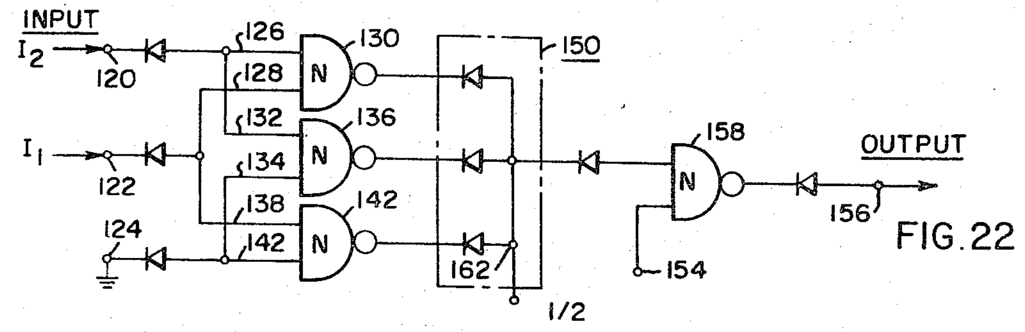
FIG. 22 is a schematic circuitry diagram of the circuit of FIG. 21, programmed to perform the logic function 1/2.

FIG. 22 is a schematic circuitry diagram of the basic circuit illustrated and described with reference to FIG. 21 programmed to produce the 1/2 logic function. The circuit of FIG. 22 is identical to the programmed circuit of FIG. 21 with the addition of a second input supplied from a second sensor to terminal 120. As described with reference to the circuit of FIG. 21 terminal 124 provides a logical zero input to gates 142 and 136, maintaining their respective outputs at a logical one state. Therefore, the output of gate 130 is controlling. Gate 130 receives inputs from the two sensors providing signals to terminals 120 and 122, respectively. When either of the two sensors provides a logical zero state input indicating that a fault condition exists the output of gate 130 will assume the logical one state providing a logical one input to gate 158 and a logical zero output at terminal 156, indicating that a command actuation is required. Both sensors providing inputs to the corresponding terminals 120 and 122 must provide a logical one input indicating that no fault condition exists before gate 130 will produce a logical zero output which will appear as a logical one output at terminal 156 indicating that a command actuation is not required. Thus, the programmed arrangement of the circuit illustrated in FIG. 22 provides the 1/2 logic function.

Figure 23:
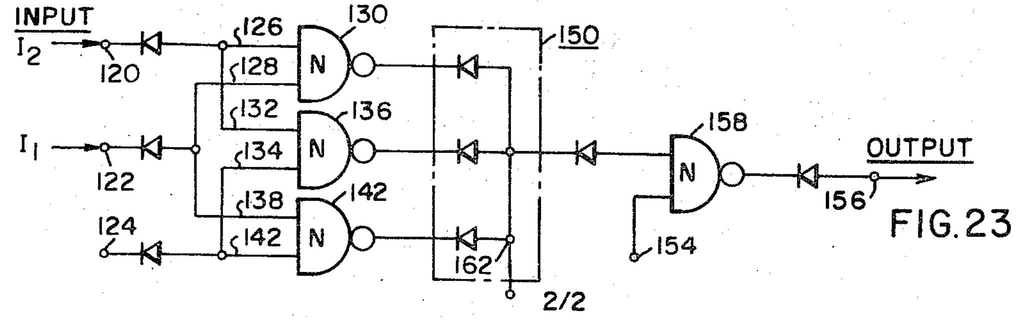
FIG. 23 is a schematic diagram of the circuitry of FIG. 21, programmed to perform the logic function 2/2.

FIG. 23 illustrates a schematic circuitry diagram of the circuit of FIG. 21 programmed to perform the 2/2 logic function. The circuit of FIG. 23 is identical to the circuit of FIG. 22 with the exception that terminal 124 is left floating. Thus, terminal 124 will be accepted as a logical one input to terminals 140 and 134 of gates 142 and 136, respectively.

In order for a logical zero output, indicating actuation, to appear at terminal 156 the input to each of the diodes of AND gate 150 will have to assume the logical one state requiring that at least one input to each of the respective NAND gates 130, 136 and 142 assumes a logical zero state. In order for this condition to arise, both of the inputs at terminals 120 and 122, respectively, will have to assume the logical zero state indicating that each of the corresponding sensors associated with each of those inputs has indicated that an adverse condition exists. Thus, an actuation will only be commanded when each of the corresponding sensors supplying inputs to terminals 120 and 122, respectively, provides a logical zero input, accomplishing the 2/2 logic function.

Figure 24:
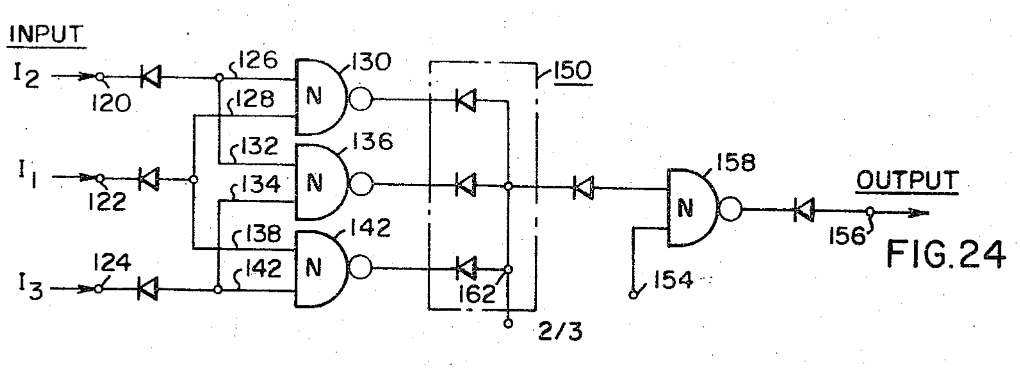
FIG. 24 is a schematic circuitry diagram of the circuit of FIG. 21, programmed to perform the logic function 2/3.

FIG. 24 illustrates a schematic circuitry diagram of the basic circuit illustrated in FIG. 21 programmed to perform the 2/3 logic function. The circuit of FIG. 24 is identical to the circuit of FIG. 23 with the addition of a third input supplied at terminal 124. In conformance with the characteristics of AND gate 150 each of the corresponding outputs of the respective gates 130, 136 and 142 will have to assume the logical one state before a logical zero output will appear at terminal 156 requiring actuation. This condition will only occur if at least one terminal input to each of the three respective gates 130, 136 and 142 assumes the logical one state. In conformance with the design terminal couplings of terminals 120, 122 and 124 to gates 130, 136 and 142, this condition will occur when any two of the three inputs to the terminals 120, 122 and 124, respectively, assume the logical zero state. Thus, when any two of the three sensors provide inputs to terminals 120, 122 and 124, respectively, indicating that an adverse condition exists, a logical zero actuation signal will appear at terminal 156, accomplishing the 2/3 logic function.

Figure 25:
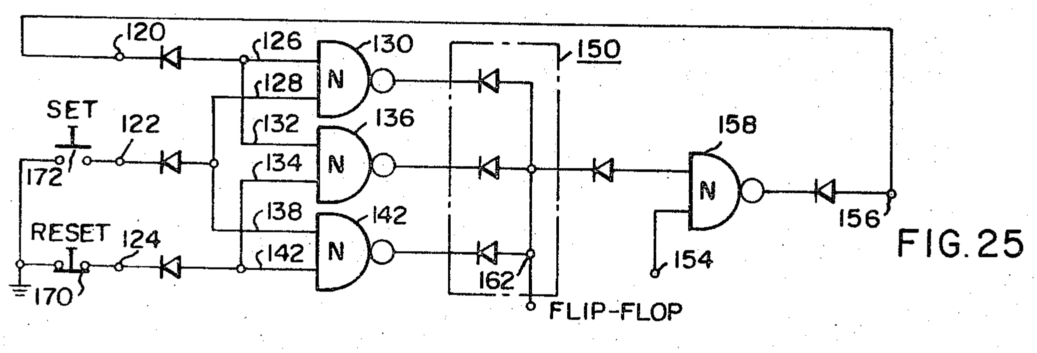
FIG. 25 is a schematic circuitry diagram of the circuit of FIG. 21, programmed to perform the function of an R-S flip-flop.

FIG. 25 is a schematic circuitry diagram of the basic circuit illustrated in FIG. 21, programmed to produce an R-S flip-flop function. The programmed connections provide electrical communication between output terminal 156 and input terminal 120, and couple input terminal 122 to ground through a normally open set switch 172 and terminal 124 to ground through normally closed reset switch 170. With the reset and set switches, 170 and 172, in their normally closed and open positions, respectively, gates 136 and 142 will receive a logical zero input providing a logical one output to AND gate 150. Thus, gate 130 will control the output of AND gate 150. The two stable states of the flip-flop can be illustrated by noting that when a logical zero state output appears at terminal 156 it will be communicated by the program connection to input terminal 120 and appear as a logical zero input at terminal 126 to gate 130. Gate 130 will supply a logical one input to gate 150 which will be communicated to the input terminal of NAND gate 158, enabling a logical zero stable state at output terminal 156. Similarly, if a logical one state appears at output terminal 156 it will be communicated by the programmed connection to input terminal 120 and appear as a logical one input at terminal 156 to NAND gate 130. The additional input at terminal 128 to gate 130 will assume the logical one state due to the normally open set switch 172, providing a logical zero at the output of gate 130 which will be communicated by AND gate 150 to the input of NAND gate 158 enabling a logical one stable state at output terminal 156. Depressing the set switch 172 will ground terminal 128 of gate 130 providing the additional logical one input to the diodes of AND gate 150 necessary to communicate a logical one input to NAND gate 158 enabling a logical zero output to appear at terminal 156, accomplishing the set function. With the set switch 172 in its normally open position and the reset switch 170 depressed the inputs 138 and 140 to gate 142 will be left floating providing a logical zero output which will be communicated by AND gate 150 to the input of NAND gate 158 and appear as a logical one output at terminal 156, accomplishing the reset function. Depressing both the set and reset switches 172 and 170, so that set switch 172 and reset switch 170 is closed and open, respectively, will provide a logical zero input to gates 130 and 142 maintaining their corresponding outputs at the logical one state with gate 136 controlling the output of AND gate 150. NAND gate 136 will receive a logical one input at terminal 134 from the opened reset switch and input terminal 132 to gate 136 will control the output of gate 136. Input terminal 132 will assume the state of the flip-flop output 156, so that if a logical zero appears at the output 156 it will be communicated to the input 120 providing a logical one state at the output of gate 136 and a logical zero at terminal 156, not requiring a change of state. Similarly, if a logical one appears at the output of terminal 156 it will be communicated to input terminal 120 and appear at terminal 132 at the input of gate 136, causing a logical zero output to be communicated to NAND gate 158 through AND gate 150 and enabling a logical one output at terminal 156, not requiring a change of state. Thus, the programmed connections shown in FIG. 25 of the basic circuit illustrated in FIG. 21 produce an R-S flip-flop. It should be realized that increased AC noise immunity may be accomplished by interposing a filter similar to the filter illustrated by reference character 90 in the circuit of FIG. 2 between the output of AND gate 150 and the input of NAND gate 158. Furthermore, greater electrical isolation can be achieved by including two inverters on either side of the filter in an arrangement similar to the inverter arrangement 88 and 98 illustrated in the circuit of FIG. 2.

Figure 26:
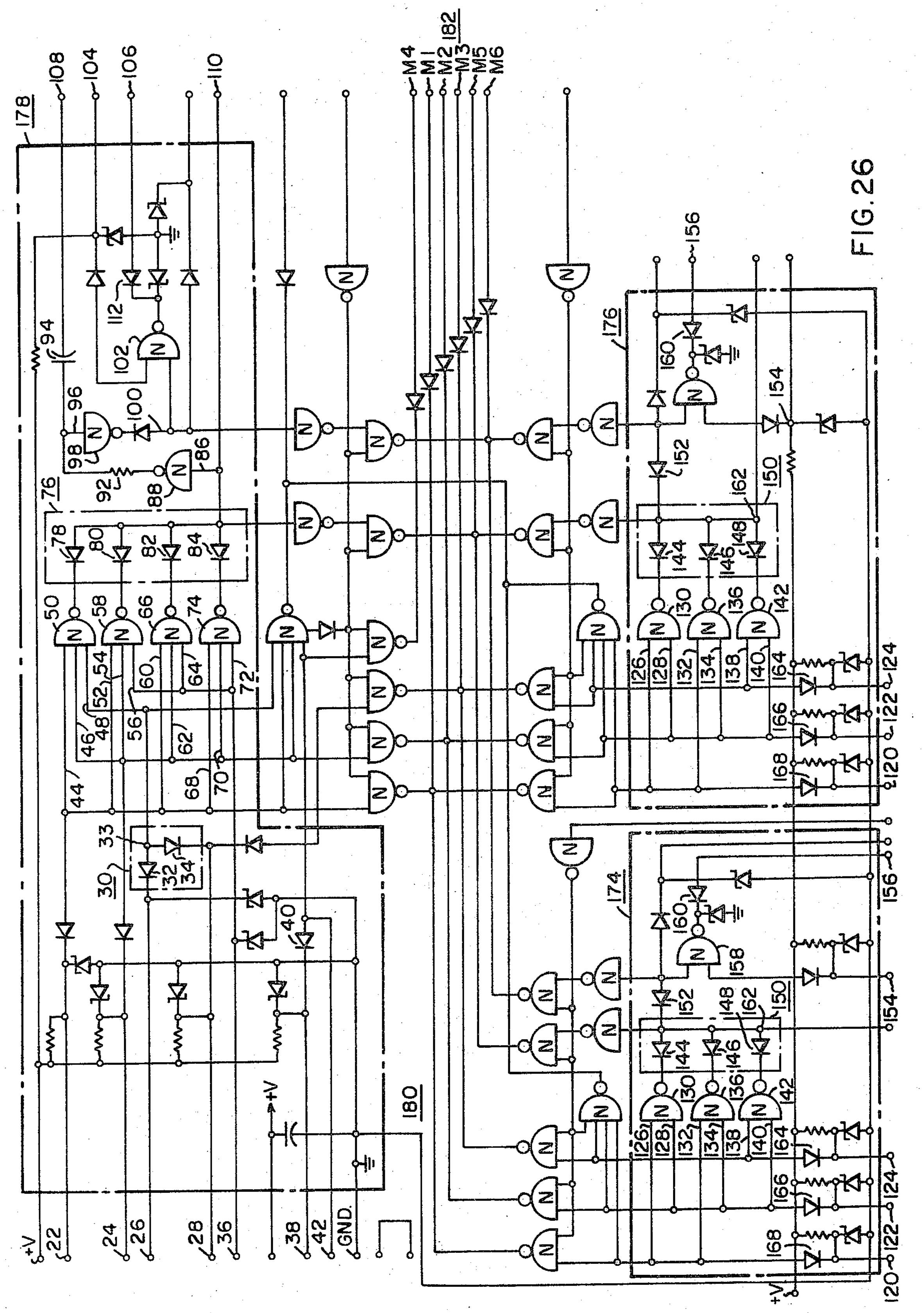
FIG. 26 is a schematic circuitry diagram of an exemplary multiplexing arrangement of the circuits of FIGS. 20 and 21.

The signals employed in the basic logic circuit modules, illustrated in FIGS. 2 and 21, can be entered into a multiplexing sub-system as illustrated in FIG. 26. The multiplexing arrangement illustrated in FIG. 26 is specifically suitable for nuclear reactor protection and safeguard applications, though it is to be understood that similar multiplexing arrangements can be provided for other applications. The specific exemplary arrangement shown in FIG. 26 provides three programmable, universal logic circuits 174, 176 and 178, having various degrees of versatility. The circuits of blocks 174 and 176 are identical to the basic circuit illustrated in FIG. 21, while the circuit of block 178 is identical to the basic circuit illustrated in FIG. 2, with the addition of biasing means provided for the diodes and gates through the various resistors, diodes and zener diodes shown for the specific application to nuclear reactor control systems. The zener diodes are specifically provided for noise suppression to protect the logic gates described, while the resistors are provided for contact film breakage on the input mechanical contacts employed in nuclear plant applications. The circuitry arrangement provided in block 180 is a state of the art multiplexing arrangement used to multiplex each of the inputs and outputs of the various circuits 174, 176 and 178 to provide multiplexed monitoring signals 182 at terminals M-1, M-2, M-3, M-4, M-5, and M-6 which are outputted at the nuclear reactor control room for constant surveillance of the systems operation. Like reference characters refer to like circuit elements previously illustrated in FIGS. 2 and 21.

Thus, this invention provides a programmable, universal module which produces a plurality of logic functions such as the logic functions required within a protection and safeguard system employed in a nuclear reactor. The various logic functions are accomplished through programmed connections which can be provided in a manual mode through a minimum of back wiring or in an automatic mode through automated movable contacts which are well known in the art. The system, thus described, has the advantage of: increased reliability through the use of integrated circuits; reduced physical size; reduced overall power requirements; reduced susceptibility to seismic vibrations; reduced maintenance costs, reduced reaction time; simpler testing and monitoring; and minimized wiring required to program a function. Furthermore, a minimum number of circuit card arrangements are required to produce the total protection and safeguard logic system in a nuclear reactor power plant application.

I claim as my invention:

1. A programmable, universal logic module comprising:

logic means having a number of *p* input means where *p* is an integer greater than or equal to one, and a first output means, each of said input and output means capable of assuming either a first or second logical state, respectively, said logic means including a plurality of NAND gates, an AND gate having a plurality of inputs from the respective outputs of said NAND gates and an inverter having an input from said AND gate output and wherein the output of said inverter forms said first output means;

$n$ signal means, where $n$ is an integer less than or equal to $p$, operably connected to $n$ of said $p$ input means, so as to provide at least one logical input signal to said logic means; and the remainder of said $p$ minus $n$ input means operably arranged so as to provide an output signal of said first state at said first output means whenever at least $m$ of said $n$ signal means assume said first state, where $m$ is a predetermined integer less than or equal to $n$.

2. The logic module of claim 1 including:

programmable means for arranging said $p$ minus $n$ input means according to said predetermined integer $m$ of said $n$ signal means required to assume said first state before said first output means assumes said first state.

3. The logic module of claim 1 wherein said $p$ input means and said first output means are constructed to be operably arranged to form a binary flip-flop without rearrangement or addition of internal logic components.

4. The logic module of claim 3 wherein said first output means is operably connected to at least one of said $p$ input means.

5. The logic module of claim 4 wherein said $n$ signal means are provided through ground connections.

6. The logic module of claim 5 wherein $n$ equals 2, including:

a first normally closed switch connected between ground and a first of said $p$ input means and operably arranged to provide a reset signal to said flip-flop when said first switch is opened; and a second normally open switch connected between ground and a second of said $p$ input means and operably arranged to provide a set signal to said flip-flop when said second switch is closed and said first switch is open.

7. The logic module of claim 3 including:

a noise filter operably connected to said first output means to filter pulses of relatively short duration due to noise so as to avoid changes in the state of said first output means caused thereby.

8. The logic module of claim 7 wherein said filter comprises:

a resistor connected in series with said first output; and a capacitor connected at the output of said resistor, between said resistor and ground.

9. The logic module of claim 1 including:

means for inhibiting said first output from assuming said first state.

10. The logic module of claim 9 wherein said inhibiting means comprises:

a logic gate having a plurality of inputs, at least a first of said gate inputs being connected to said first output means; and inhibiting signal means connected to at least a second of said gate inputs, operable on command to provide a signal to said gate of a logical state sufficient to maintain said gate output at said second state.

11. The logic module of claim 1 wherein unconnected inputs to said logic means, left floating, will be accepted as assuming said second state.

12. The logic module of claim 1 wherein said logic means includes a second output positioned intermediate of said first output means and said NAND gates, operable to be connected to like second outputs on substantially similar logic modules to produce an AND'ed function of said modules at said first output means.

13. The logic module of claim 1 including:

a plurality of substantially similar modules, each having a first output means, wherein the interconnection of said respective first output means provides an OR'ed function of said plurality of modules at each of said respective first output means.

14. The logic module of claim 1 wherein a plurality of said $p$ input means are AND'ed to form a common input to said logic means.

15. The logic module of claim 1 wherein said inverter comprises a NAND gate having at least two inputs, the first of said inputs being connected to the output of said AND gate and the second of said inputs normally assuming said second state, operable upon command to provide a signal of said first state so as to inhibit the output of said NAND gate and maintain said NAND output at said second state.

16. The logic module of claim 1 wherein said logic means includes four NAND gates connected in parallel, each of said NAND gates having at least three inputs, said plurality of $p$ input means comprising:

a first terminal having parallel connections to a first input of a first, second and third of said four NAND gates, respectively;

a second terminal having parallel connections to a second input on a first, second, and fourth of said four NAND gates, respectively;

a third terminal;

a fourth terminal;

a second AND gate having inputs from said third and fourth terminals, respectively, and an output connected in parallel to a third input on said first NAND gate and a second input on said third and fourth NAND gates, respectively;

a fifth terminal having parallel connections to a third input on said second, third and fourth NAND gates, respectively;

a sixth terminal;

a seventh terminal; and a diode connected between said sixth and seventh terminals, positioned to pass current from said seventh terminal to said sixth terminal.

17. The logic module of claim 16 wherein said fifth terminal is grounded and said signal means is operably coupled to said first terminal so as to provide an output signal of said first state at said first output means whenever said signal means provides an input signal of said first state to said first terminal.

18. The logic module of claim 16 wherein said fifth terminal is grounded, a first of said $n$ signal means is operably coupled to said first terminal and a second of said $n$ signal means is operably coupled to said second terminal so as to provide an output signal of said first state at said first output means whenever at least either said first or second signal means provides an input signal of said first state to said first or second terminals, respectively.

19. The logic module of claim 16 wherein said fifth terminal is grounded, a first of said $n$ signal means is operably coupled to said first terminal, a second of said $n$ signal means is operably coupled to said second terminal and a third of said $n$ signal means is operably coupled to said fourth terminal so as to provide an output signal of said first state at said first output means whenever at least either said first, second or third signal means provides an input signal of said first state to said first, second or fourth terminals, respectively.

20. The logic module of claim 16 wherein said fifth terminal is grounded, said third terminal is connected to said seventh terminal, a first of said *n* signal means is operably coupled to said first terminal a second of said *n* signal means is operably coupled to said second terminal, a third of said *n* signal means is operably coupled to said fourth terminal and a fourth of said *n* signal means is operably coupled to said sixth terminal so as to provide an output signal of said first state at said first output means whenever at least either said first, second, third or fourth signal means provides an input signal of said first state to said first, second, fourth or sixth terminals, respectively.

21. The logic module of claim 16 wherein a first of said *n* signal means is operably connected to said first terminal and a second of said *n* signal means is operably connected to said second terminal so as to provide an output signal of said first state at said first output means whenever both said first and second signal means provides an input signal of said first state to said first and second terminals, respectively.

22. The logic module of claim 16 wherein a first of said *n* signal means is operably connected to said first terminal, a second of said *n* signal means is operably connected to said second terminal and a third of said *n* signal means is operably connected to said fourth terminal so as to provide an output signal of said first state at said first output means whenever any two of said first, second or third signal means provides an input signal of said first state to said first, second or fourth terminals, respectively.

23. The logic module of claim 16 wherein said seventh terminal is connected to said fifth terminal, a first of said *n* signal means is operably connected to said first terminal, a second of said *n* signal means is operably connected to said second terminal, a third of said *n* signal means is operably connected to said fourth terminal and a fourth of said *n* signal means is operably connected to said sixth terminal so as to provide an output signal of said first state at said first output means whenever any two of said first, second, third or fourth signal means provides an input signal of said first state to said first, second, fourth or sixth terminals, respectively.

24. The logic module of claim 16 wherein said third terminal is connected to said first output, said fifth terminal is connected to said seventh terminal and said signal means comprises:

a normally open switch connected between ground and said fourth terminal;

a normally closed switch connected between ground and said sixth terminal; and said normally open and normally closed switches operating respectively as the set and reset switches of an R-S flip-flop providing a stable output of either said first or second state at said first output means, respectively, when switched.

25. The logic module of claim 1 wherein said logic means includes a first, second and third NAND gate connected, in parallel, each of said NAND gates having a first and second input, said plurality of *p* input means comprising:

a first terminal having parallel connections to said first inputs on said first and second NAND gates, respectively;

a second terminal having parallel connections to said second and first inputs on said first and third NAND gates respectively; and a third terminal having parallel connections to said second inputs on said second and third NAND gates, respectively.

26. The logic module of claim 25 wherein said third terminal is grounded and a first of said *n* signal means is operably connected to said second terminal so as to provide an output signal of said first state at said first output means whenever said first signal means provides an input signal of said first state to said second terminal.

27. The logic module of claim 25 wherein said third terminal is grounded, a first of said *n* signal means is operably connected to said second terminal and a second of said *n* signal means is operably connected to said first terminal so as to provide an output signal of said first state at said first output means whenever either said first signal means or said second signal means provides an input signal of said first state to said second or first terminals, respectively.

28. The logic module of claim 25 wherein a first of said *n* signal means is operably connected to said second terminal and a second of said *n* signal means is operably connected to said first terminal so as to provide an output signal of said first state at said first output means whenever both said first and second signal means provides an input signal of said first state to said second and first terminals, respectively.

29. The logic module of claim 25 wherein a first of said *n* signal means is operably connected to said second terminal, a second of said *n* signal means is operably connected to said first terminal and a third of said *n* signal means is operably connected to said third terminal so as to provide an output signal of said first state at said first output means whenever any two of said first, second or third signal means provides an input signal of said first state to said second, first or third terminals, respectively.

30. The logic module of claim 25 wherein said first terminal is connected to said first output terminal and said signal means comprises:

a normally open switch connected between ground and said second terminal;

a normally closed switch connected between ground and said third terminal; and said normally open and normally closed switches operating, respectively, as the set and reset switches of an R-S flip-flop, providing a stable output of either said first or second state, respectively, when switched.

31. The logic module of claim 1 wherein said first state is a logical zero and said second state is a logical one.

* * * * *